United States Patent
Nakagawa et al.

(10) Patent No.: US 7,778,130 B2
(45) Date of Patent: Aug. 17, 2010

(54) OPTICAL DISC APPARATUS

(75) Inventors: Ryotaro Nakagawa, Daito (JP); Teruaki Sogawa, Daito (JP); Masanori Takahashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 518 days.

(21) Appl. No.: 11/871,679

(22) Filed: Oct. 12, 2007

(65) Prior Publication Data

US 2008/0089192 A1 Apr. 17, 2008

(30) Foreign Application Priority Data

Oct. 12, 2006 (JP) ............................. 2006-278676

(51) Int. Cl.
*G11B 7/00* (2006.01)
(52) U.S. Cl. .................. 369/53.28; 369/44.14
(58) Field of Classification Search .............. 369/44.14, 369/44.32, 53.28
See application file for complete search history.

(56) References Cited

U.S. PATENT DOCUMENTS

| | | | |
|---|---|---|---|
| 6,246,041 B1 | 6/2001 | Nakayama et al. | |
| 7,072,252 B2 | 7/2006 | Masaki et al. | |
| 7,319,648 B2 * | 1/2008 | Hong et al. | 369/53.19 |
| 2003/0043708 A1 | 3/2003 | Osanai et al. | |
| 2003/0179665 A1 | 9/2003 | Iwazawa et al. | |
| 2005/0063260 A1 | 3/2005 | Akiyama | |
| 2006/0233070 A1 * | 10/2006 | Kurokawa et al. | 369/44.23 |

FOREIGN PATENT DOCUMENTS

| | | |
|---|---|---|
| EP | 0 478 367 A2 | 4/1992 |
| JP | 9-312025 A | 12/1997 |
| JP | 11-161978 A | 6/1999 |
| JP | 11-316959 A | 11/1999 |
| JP | 2003-099964 A | 4/2003 |
| JP | 2003-257053 A | 9/2003 |
| JP | 2004-241081 A | 8/2004 |
| JP | 2005-158093 A | 6/2005 |
| JP | 2006-073084 A | 3/2006 |
| JP | 2006-099928 A | 4/2006 |
| WO | WO 2006/067675 A1 | 6/2006 |

OTHER PUBLICATIONS

European Search Report dated Aug. 6, 2008 (seventeen (17) pages).

* cited by examiner

*Primary Examiner*—Wayne R Young
*Assistant Examiner*—Adam R Giesy
(74) *Attorney, Agent, or Firm*—Crowell & Moring LLP

(57) ABSTRACT

An optical disc apparatus comprises, an optical pickup, a signal extracting unit for reading address information and an RF signal from an optical disc based on signal read by the optical pickup, and a main controller for performing jitter control and focus control. At an initial reading of the optical disc, the main controller determines whether an address information detector succeeds in reading the address information. If not successful (NO in S3), the main controller offsets a defocus position to two points in plus and minus directions from a defocus position giving best jitter (S7), calculates an approximate curve of signal level characteristics with a peak value (S8), and adjusts and allows the defocus value to correspond to this peak value (S9). If the optical disc apparatus cannot read address information, depending on the defocus value, it increases the signal level of the address information by the defocus position adjustment.

8 Claims, 7 Drawing Sheets

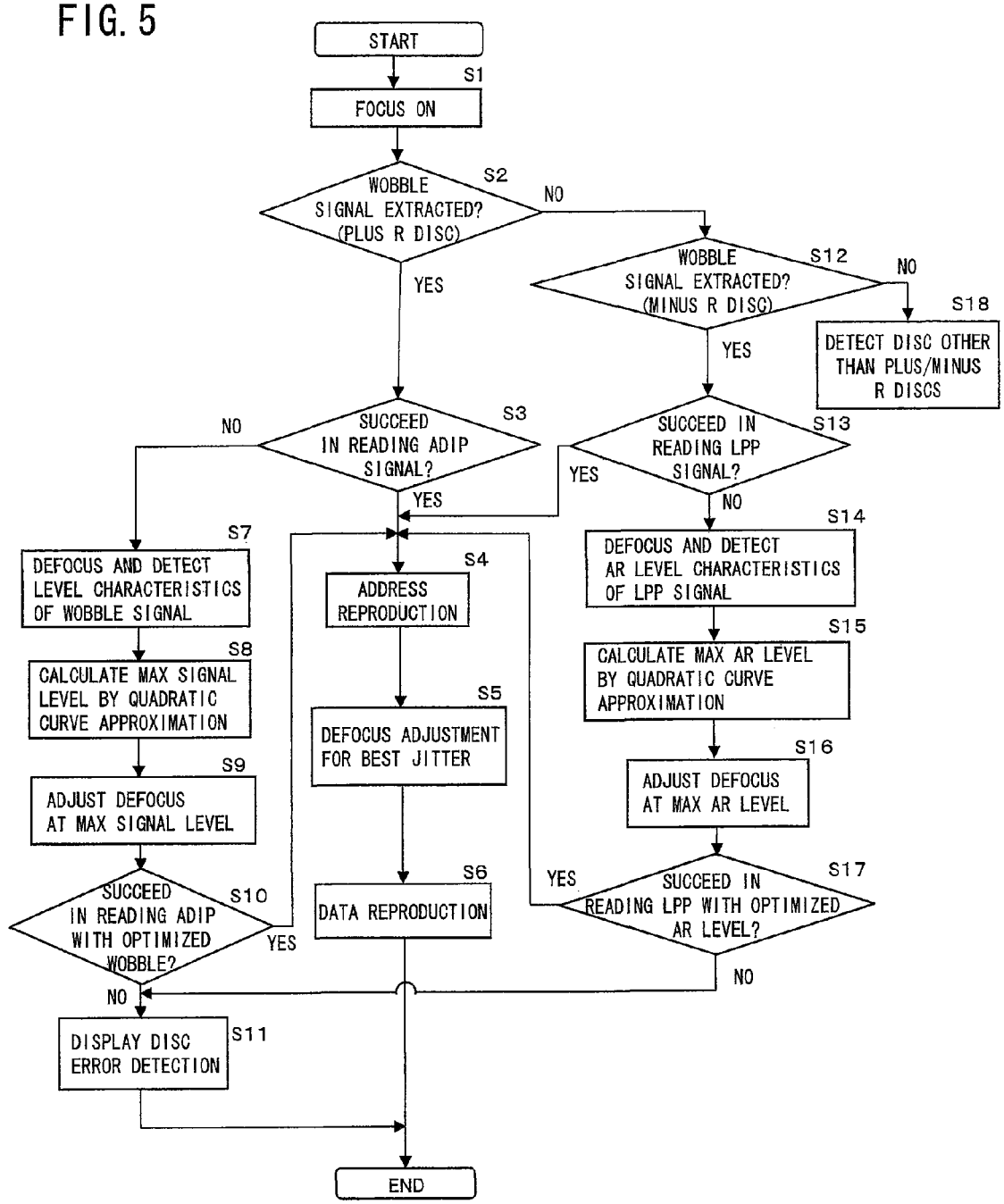

OPTICAL DISC APPARATUS

BACKGROUND OF THE INVENTION

1. Field of the Invention

The present invention relates to an optical disc apparatus for recording/reproducing data on/from an optical disc such as DVD (Digital Versatile Disc), and more particularly an optical disc apparatus with a performance which enables secure reading of address information from the optical disc at an initial reading of the optical disc.

2. Description of the Related Art

It is known that this kind of optical disc apparatus can record/reproduce data on/from various optical discs such as DVD +R (Recordable), DVD +RW (Rewritable), DVD −R (Recordable) and DVD −RW (Rewritable) in addition to DVD-RAM (Random Access Memory) and DVD-ROM (Read Only Memory). Address information is preformatted and recorded on a data recording surface of each of these optical discs with wobbled grooves and lands. The address information in DVD +RW and DVD +R discs (i.e. plus R discs) is formed of a wobble signal (f1) based on the wobbled grooves and containing an ADIP (Address in Pre-groove) signal. On the other hand, the address information in DVD −RW and DVD −R discs (i.e. minus R discs) is formed of an LPP (Land Pre-Pit) signal based on pre-pits on the lands and of a wobble signal (f2) which is based on the wobbled grooves and has a frequency different from that of the wobble signal (f1) of the plus R discs.

When starting the operation of the optical disc apparatus, it automatically performs defocus adjustment such that a laser beam from an optical pickup, with an objective lens, of the optical disc apparatus is focused on a data or signal recording surface of an optical disc at a point giving a maximum RF signal which gives the best jitter performance. Before each operation of recording/reproducing data on/from the optical disc, the address information in the optical disc is required to be first read for address reproduction. When reading the disc, the aberration of the optical system forming the optical pickup such as an objective lens needs to be considered.

If the aberration of the optical system is small, the defocus position of the objective lens (relative to the optical disc) which gives the best jitter performance substantially coincides with the defocus position of the objective lens giving a maximum level of the address information, so that the address information can be read normally. However, if the optical system of the optical pickup is large, the beam spot of the laser beam irradiated on the recording surface of the optical disc is not circular, causing a distortion therein. Thus, the defocus position giving the best jitter performance is displaced or offset from the defocus position giving the maximum level of the address information. This reduces the level of the address information, which may make it impossible to read the address information for the address reproduction. If the aberration of the optical system is very large, it may even cause a disc error.

In the prior art, there are various optical disc apparatus in this field. For example, Japanese Laid-open Patent Publication 2003-99964 discloses an optical disc apparatus which uses an optical disc having multiple recording layers, and controls an objective lens. More specifically, a focus error signal is generated based on reflected light from a recording layer currently being accessed, and then a defocus amount of the objective lens obtained from a characteristic value of another signal based on this reflected light is superimposed on the focus error signal to correct the focus error signal, so as to control the objective lens. Japanese Laid-open Patent Publication 2005-158093 discloses an optical disc apparatus comprising aberration generating means for generating aberration, reproduction signal acquisition means for acquiring a reproduction signal of information based on reflected light from an optical disc having a guide groove, and groove shape signal acquisition means for acquiring a groove shape signal based on the reflected light from the guide groove. Based on the reproduction signal and the groove shape signal, the aberration generating means corrects the aberration. However, each of the optical disc apparatus of the two patent publications has a complex structure, causing high cost, and requires a long time to read the address information when reproducing the optical disc.

On the other hand, Japanese Laid-open Patent Publication Hei 11-316959 discloses an optical disc apparatus in which a center value of a focus tolerance range for address reproduction and a focus tolerance range for data reproduction is set as an optimum focus bias. Further, Japanese Laid-open Patent Publication Hei 11-161978 discloses an optical disc apparatus in which a predetermined offset amount is applied to focus servo control means so as to change the focus of a laser beam, while an error rate of data, which is reproduced from an optical disc by reproducing means, is acquired so as to achieve focusing at a focal position giving a minimum error rate.

Japanese Laid-open Patent Publication 2003-257053 discloses an optical disc apparatus in which a focus offset value giving a minimum amount of recording light with a minimum error rate of reproduced information is set as an optimum focus offset (defocus) value. However, these optical disc apparatus have drawbacks. In the apparatus of Japanese Laid-open Patent Publication Hei 11-316959, the level of the address information may not be maximum at the time of address reproduction, degrading the address information reading performance. The apparatus of Japanese Laid-open Patent Publication Hei 11-161978 does not necessarily optimize the error rate of the address information, while the apparatus of Japanese Laid-open Patent Publication 2003-257053 may not increase the signal level of the address information.

There are other optical disc apparatus to adjust the focus bias and spherical aberration. For example, Japanese Laid-open Patent Publication 2006-99928 discloses an optical disc apparatus which has a spherical aberration correction mechanism to find a combination of a spherical aberration correction value and a focus bias giving a maximum RF signal so as to record/reproduce data based on the found spherical aberration correction value and focus bias. Japanese Laid-open Patent Publication 2004-241081 discloses an optical disc apparatus having a spherical aberration correction mechanism and evaluation value generating means which uses RF amplitude values as evaluation values, and acquires an optimum evaluation value from tolerance limit points of the evaluation values so as to allow a focus bias and a spherical aberration correction value to cause or correspond to the optimum evaluation value. Japanese Laid-open Patent Publication 2006-73084 discloses an optical disc apparatus which has a spherical aberration correction mechanism, and varies a focus bias and a spherical aberration correction value so as to find an optimum focus bias from both points of view of a maximum RF signal and a maximum push-pull signal. However, the apparatus of these three patent publications require a spherical aberration correction mechanism, causing a complex and expensive structure.

SUMMARY OF THE INVENTION

An object of the present invention is to provide an optical disc apparatus with improved performance of reading address information, particularly at an initial reading when an optical disc is inserted into the optical disc apparatus.

According to a first aspect of the present invention, the above object is achieved by an optical disc apparatus comprising: an optical pickup for irradiating a laser beam onto an optical disc through an objective lens to record or read data on or from the optical disc; an address information reading unit for using the data read by the optical pickup to read address information in the data based on wobbled grooves and/or land pre-pits preformatted and recorded on the optical disc, and to detect signal levels of the address information; an RF signal reading unit for reading an RF signal corresponding to the data recorded on the optical disc; and a defocus control unit for controlling jitter of the RF signal read by the RF signal reading unit and for adjusting a defocus position of the objective lens based on a focus error signal to perform focus control.

Therein, the defocus control unit comprises: a reading determination unit which, at an initial reading of the optical disc, controls the address information reading unit to read the address information, and determines based on the reading of the address information reading unit whether the address information reading unit succeeds in reading the address information; a defocus position offset unit for offsetting the defocus position of the objective lens when the reading determination unit determines that the address information reading unit fails in reading the address information; an approximate level line calculating unit for calculating an approximate line of characteristics of the signal levels of the address information detected by the address information reading unit at defocus positions offset by the defocus position offset unit; and a defocus position adjusting unit for adjusting the defocus position of the objective lens at a position corresponding to a peak value of the approximate line calculated by the approximate level line calculating unit, wherein after the defocus position adjusting unit adjusts the defocus position, the defocus control unit controls the address information reading unit to read the address information, thereby improving the signal level of the address information to be read.

The optical disc apparatus according to the first aspect of the present invention makes it possible to improve or increase the signal level of the address information in the case where the address information cannot be read at an initial reading of the optical disc. This optical disc apparatus enables reading of the address information for address reproduction even in this situation, thereby making it possible to record/reproduce data on/from the optical disc.

Preferably, the defocus position offset unit offsets the defocus position of the objective lens to two points, which are offset in plus and minus directions from the defocus position giving minimum jitter, when the reading determination unit determines that the address information reading unit fails in reading the address information, wherein the approximate level line calculating unit calculates the approximate line of characteristics of the signal levels of the address information detected by the address information reading unit at the two points of defocus positions offset by the defocus position offset unit. This makes it possible to improve or increase the signal level of the address information to a peal value quickly in a simple manner in the case where the address information cannot be read at an initial reading of the optical disc. This enables secure reading of the address information for address reproduction, thereby making it possible to smoothly record/reproduce data on/from the optical disc.

Further preferably, the approximate level line calculating unit calculates, by quadratic curve approximation, the approximate line using astigmatism of the characteristics of the signal levels as a parameter. This makes it possible to securely read the address information at an initial reading of the optical disc, so that it becomes possible to expand the range of astigmatism values of the optical system of the optical disc apparatus, in which range the address information can be detected or read. Thus, it can be said that the variation in astigmatism value of the optical system of the optical disc apparatus including the objective lens, which is caused in the manufacturing process of the optical disc apparatus, can be absorbed by the optical disc apparatus, thereby leading to an improvement in the production yield and cost reduction of the optical disc apparatus.

According to a second aspect of the present invention, the above-described object is achieved by an optical disc apparatus comprising: an optical pickup for irradiating a laser beam onto an optical disc through an objective lens to record or read data on or from the optical disc; an address information reading unit for using the data read by the optical pickup to read address information in the data based on wobbled grooves and/or land pre-pits preformatted and recorded on the optical disc, and to detect error rates of the address information; an RF signal reading unit for reading an RF signal corresponding to the data recorded on the optical disc; and a defocus control unit for controlling jitter of the RF signal read by the RF signal reading unit and for adjusting a defocus position of the objective lens based on a focus error signal to perform focus control.

Therein, the defocus control unit comprises: a reading determination unit which, at an initial reading of the optical disc, controls the address information reading unit to read the address information, and determines based on the reading of the address information reading unit whether the address information reading unit succeeds in reading the address information; a defocus position offset unit for offsetting the defocus position of the objective lens when the reading determination unit determines that the address information reading unit fails in reading the address information; an approximate error rate line calculating unit for calculating an approximate line of characteristics of the error rates of the address information detected by the address information reading unit at defocus positions offset by the defocus position offset unit; and a defocus position adjusting unit for adjusting the defocus position of the objective lens at a position corresponding to a bottom value of the approximate line calculated by the approximate error rate line calculating unit, wherein after the defocus position adjusting unit adjusts the defocus position, the defocus control unit controls the address information reading unit to read the address information, thereby improving the error rate of the address information to be read.

The optical disc apparatus according to the second aspect of the present invention makes it possible to improve or reduce the error rate of the address information in the case where the address information cannot be read at an initial reading of the optical disc. This optical disc apparatus enables reading of the address information for address reproduction even in this situation, thereby making it possible to record/reproduce data on/from the optical disc.

Preferably, the defocus position offset unit offsets the defocus position of the objective lens to two points, which are offset in plus and minus directions from the defocus position giving minimum jitter, when the reading determination unit determines that the address information reading unit fails in reading the address information, wherein the approximate error rate line calculating unit calculates the approximate line of characteristics of the error rates of the address information detected by the address information reading unit at the two points of defocus positions offset by the defocus position offset unit. This makes it possible to improve or reduce the error rate of the address information to a bottom value quickly in a simple manner in the case where the address information cannot be read at an initial reading of the optical disc. This enables secure reading of the address information for address reproduction, thereby making it possible to smoothly record/reproduce data on/from the optical disc.

Further preferably, the approximate error rate line calculating unit calculates, by quadratic curve approximation, the approximate line using astigmatism of the characteristics of the error rates as a parameter. This makes it possible to securely read the address information at an initial reading of the optical disc, so that it becomes possible to expand the range of astigmatism values of the optical system of the optical disc apparatus, in which range the address information can be detected or read. Thus, it can be said that the variation in astigmatism value of the optical system of the optical disc apparatus including the objective lens, which is caused in the manufacturing process of the optical disc apparatus, can be absorbed by the optical disc apparatus, thereby leading to an improvement in the production yield and cost reduction of the optical disc apparatus.

According to a third aspect of the present invention, the above-described object is achieved by an optical disc apparatus comprising: an optical pickup for irradiating a laser beam onto an optical disc through an objective lens to record or read data on or from the optical disc; an address information reading unit for using the data read by the optical pickup to read address information in the data based on wobbled grooves and/or land pre-pits preformatted and recorded on the optical disc, and to detect error rates of the address information; an RF signal reading unit for reading an RF signal corresponding to the data recorded on the optical disc; and a defocus control unit for controlling jitter of the RF signal read by the RF signal reading unit and for adjusting a defocus position of the objective lens based on a focus error signal to perform focus control, Therein, the defocus control unit comprises: an approximate level line calculating unit for calculating, in advance, approximate lines of characteristics of signal levels with varied astigmatism values by varying the astigmatism value of the optical pickup, so as to find a defocus position (hereafter referred to as "intersection defocus position") of the objective lens which gives a high signal level and at which intersections of the approximate lines are concentrated in the characteristics of signal levels; a storage unit for storing the intersection defocus in advance; and a defocus position adjusting unit which, at an initial reading of the optical disc, adjusts the defocus position of the objective lens at the intersection defocus position stored in the storage unit in advance.

The optical disc apparatus according to the third aspect of the present invention makes it possible to give a high probability of enabling reading of the address information on the optical disc even with different astigmatism values, or regardless of the astigmatism values, at an initial reading of the optical disc. In other words, the range of astigmatism values in which the address information can be detected or read can be expanded. Thus, it can be said that the variation in astigmatism value of the optical system of the optical disc apparatus including an objective lens, which is caused in the manufacturing process of the optical disc apparatus, can be absorbed by this optical disc apparatus, thereby leading to an improvement in the production yield and cost reduction of the optical disc apparatus.

Preferably, the approximate level line calculating unit calculates, by quadratic curve approximation, the approximate lines.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5 is a flow chart showing an operation of the optical disc apparatus to perform a process for reading address information on an optical disc;

DESCRIPTION OF THE PREFERRED EMBODIMENTS

Embodiments of the present invention, as the best mode for carrying out the invention, will be described hereinafter with reference to the annexed drawings. It is to be understood that the embodiments described herein are not intended as limiting, or encompassing the entire scope of, the invention.

First Embodiment

Figure 1:
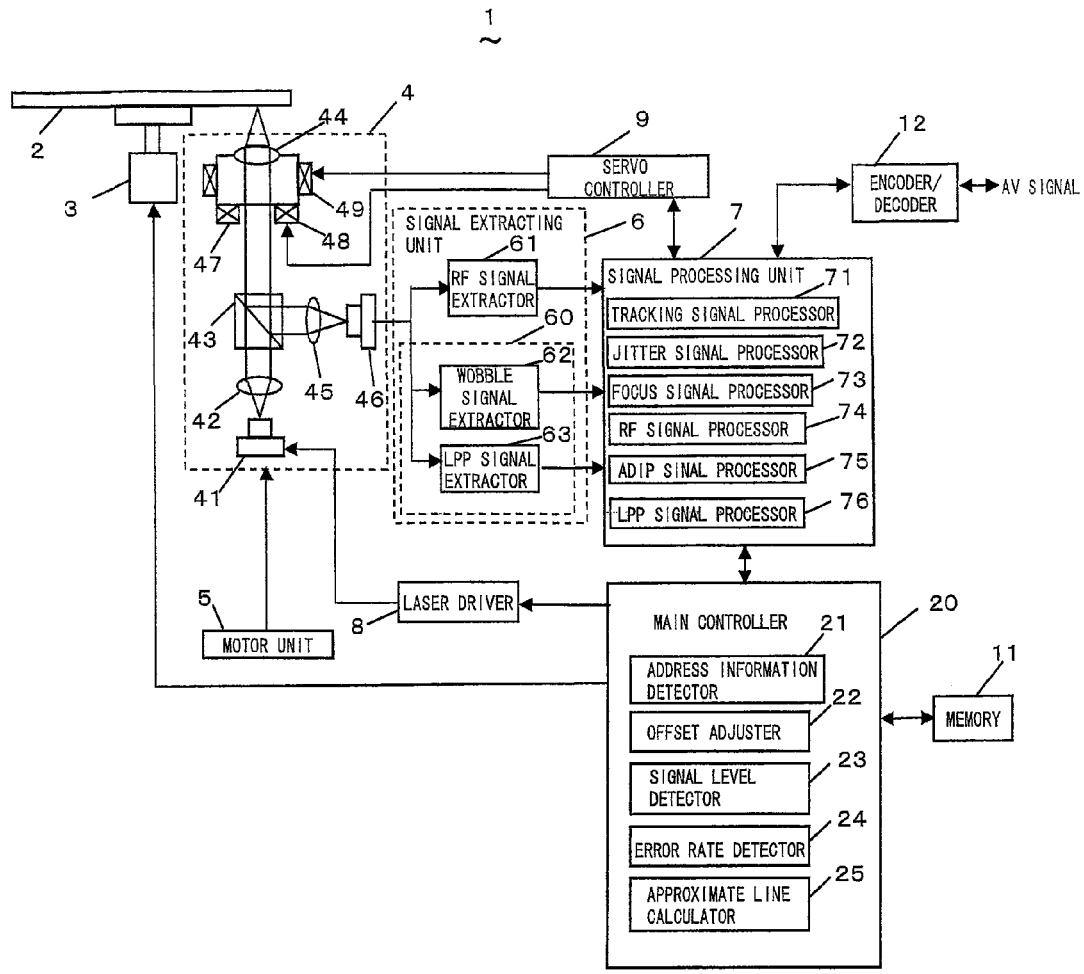
FIG. 1 is a schematic block diagram of an optical disc apparatus according to a first embodiment of the present invention.

An optical disc apparatus 1 according to a first embodiment of the present invention will be described with reference to FIG. 1 to FIG. 5. FIG. 1 is a schematic block diagram of an optical disc apparatus 1 according to a first embodiment of the present invention. It may occur that address information, which is required for recording/reproduction of an optical disc, typically DVD (Digital Versatile Disc), and recorded on the optical disc, cannot be read at an initial reading of the optical disc, depending on the defocus position (or defocus value) of an objective lens relative to the optical disc. Even in this situation, the optical disc apparatus 1 makes it possible to read the address information by adjusting the defocus and increasing the signal level of the address signal for the purpose of address reproduction. After reading the address information for address reproduction, the optical disc apparatus 1 defocuses into a state to achieve best jitter performance giving minimum jitter for recording/reproduction of data.

Referring to FIG. 1, the optical disc apparatus 1 comprises an optical disc 2, a spindle motor 3, an optical pickup 4, a motor unit 5, a signal extracting unit 6, a signal processing unit 7, a laser driver 8, a servo controller 9, a memory 11, an encoder/decoder 12 and a main controller 20. The optical disc 2 is a rewritable disc. The kind of each optical disc can be identified based on differences in frequency between signals recorded on each optical disc. More specifically, a plus R (+R) optical disc such as DVD +RW (rewritable) disc and DVD +R (recordable) disc has a wobble signal (f1) containing an ADIP (Address in Pre-groove) signal of address information. On the other hand, a minus R (−R) optical disc such as DVD −RW and DVD −R has an LPP (Land Pre-Pit) signal of address information prepitted on a land of the optical disc and a wobble signal (f2). Since these wobble signal (f1), wobble signal (f2) and LPP signal have different frequencies, they can be separated by frequency separation, which makes it possible to identify the kind of optical disc.

The optical pickup 4 comprises a semiconductor laser 41, a collimating lens 42, a beam splitter 43, an objective lens 44, a collecting lens 45, a photodetector 46, and so on. The emission of a laser beam from the semiconductor 1 is controlled by the laser driver 8 based on a signal output from the main controller 20. The laser beam emitted from the semiconductor laser 41 is collected and irradiated onto the optical disc 2 through the collimating lens 42, the beam splitter 43 and the objective lens 44. Reflection light beam reflected from the optical disc 2 enters the beam splitter 43 through the objective lens 44. The optical axis of the reflection light is then bent at 90 degrees, and collected onto the photodetector 46 by the collecting lens 45.

The optical system of the optical pickup 4 including the semiconductor laser 41, collimating lens 42, beam splitter 43 and objective lens 44 forms a light path of the optical pickup 4. The photodetector 46 has four divided light receiving sections, which output four detection signals corresponding thereto, respectively. These detection signals are used to generate various signals including an RF signal, address information (wobble signal, ADIP signal, LPP signal and the like), a focus error signal, a tracking error signal, and so on. The objective lens 44 is supported by a lens holder 47. Near the lens holder 47 are arranged a focusing coil 48 for moving the lens holder 47 by magnetic action in the optical axis direction of the objective lens 44, and a tracking coil 49 for moving the lens holder by magnetic action in the radial direction of the optical disc 2. These coils 48, 49 are each controlled by the servo controller 9 to finely adjust the position of the lens holder and the objective lens 44 supported on the lens holder 47.

The signal extracting unit 6 comprises an address information extractor 60 for extracting address information preformatted and recorded on the optical disc 2 based on electrical signals output from the photodetector 46. The signal extracting unit 6 further comprises an RF signal extractor 61 for extracting an RF signal corresponding to data recorded on the optical disc 2. The address information extractor 60 comprises a wobble signal extractor 62 for extracting a wobble signal, and an LPP signal extractor 63 for extracting an LPP signal. The wobble signal extractor 62 uses frequency separation to select and separate the wobble signal (f2) of a minus R disc (DVD −RW/DVD −R) and the wobble signal (f1) containing the ADIP signal of the address information of a plus R disc (DVD +RW/DVD +R), so as to extract the wobble signal (f1) and the wobble signal (f2).

The signal processing unit 7 comprises a tracking signal processor 71, a jitter signal processor 72, a focus signal processor 73, an RF signal processor 74, an ADIP signal processor 75 and an LPP signal processor 76. Based on a signal output from the photodetector 46, the tracking signal processor 71 generates a tracking error signal that is a signal corresponding to an offset or shift amount of the focal point of a laser beam which is irradiated on a surface of the optical disc 2 through the objective lens 44, and which is offset or shifted from a track on the surface of the optical disc 2. The jitter signal processor 72 detects or measures the jitter level of the RF signal so as to generate a jitter control signal.

The focus signal processor 73 generates a focus error signal that is a signal corresponding to an offset or shift amount of the focal point of the laser beam which is irradiated on the surface of the optical disc 2 through the objective lens 44, and which is offset or shifted from the surface of the optical disc 2. The RF signal processor 74 processes an RF signal when demodulating the RF signal from the signal extracting unit 6 to a base band signal. From the wobble signal (f1) extracted by the wobble signal extractor 62, the ADIP signal processor 75 extracts an ADIP signal phase-modulated by the wobble signal (f1), and detects or measures the signal level of the extracted ADIP signal, and further stores the results of the detection in the memory 11. The signal level of the LPP signal extracted by the LPP signal extractor 63 is detected or measured by the LPP signal processor 76 in terms of aperture ratio (described in detail later) of the waveform thereof, and stores the results of the detection in the memory 11.

The spindle motor 3 rotates the optical disc 2 mounted on a tray, while the motor unit 5 moves the optical pickup 4 in a radial direction of the optical disc 2. The laser driver 8 controls the semiconductor laser 41 of the optical pickup 4. The servo controller 9 adjusts the position of the objective lens 44 based on the output signals from the signal processing unit 7 including the tracking error signal, jitter control signal and focus error signal, so as to adjust the focus position of the laser beam emitted by the semiconductor laser 41. The servo controller 9 adjusts the focus position by applying an appropriate focus bias to a focus loop of servo operation. The encoder/decoder 12 is formed of an encoding/decoding circuit for recording/reproducing video and audio information on/from the optical disc 2.

The main controller 20 comprises: an address information detector 21 for reading and detecting address information from the ADIP signal or the LPP signal; an offset adjuster 22 for adjusting the defocus of the objective lens by offsetting, in a plus or minus direction, a defocus value giving the best jitter performance; a signal level detector 23 for detecting (measuring) the signal level characteristics of address information; an error rate detector 24 for detecting the error rate characteristics of address information; and an approximate line calculator for calculating approximate lines of these signal level characteristics and the error rate characteristics. The main controller 20 controls the spindle motor 3, the motor unit 5, the signal extracting unit 6, the signal processing unit 7, the laser drive 8, the servo controller 9, the memory 11, the encoder/decoder 12 and the like so as to control the entire optical disc apparatus 1. Note that the detection of the respective signals by the address information detector 21 can be performed based on, but not limited to, the magnitude of the signal level obtained by the signal level detector 23, or the level of the error rate obtained by the error rate detector 24.

As to the correspondence between the elements of the optical disc apparatus 1 described above, the claimed "address information reading unit" comprises the address information extractor 60, including the wobble signal extractor 62 and the LPP signal extractor 63, the ADIP signal processor 75, the LPP signal processor 76, the signal level detector 23 and the error rate detector 24. The claimed "RF signal reading unit" comprises the RF signal extractor 61 and the RF signal processor 74. The claimed "defocus control unit" comprises the focus signal processor 73 and the main controller 20. The claimed "reading determination unit" comprises the main controller 20 including the address information detector 21.

Further, the claimed "defocus position offset unit" comprises the main controller 20 including the offset adjuster 22. The claimed "approximate level line calculating unit" comprises the main controller 20 including the signal level detector 23 and the approximate line calculator 25. The claimed "defocus position adjusting unit" comprises the focus signal processor 73 and the main controller 20. Similarly, the claimed "defocus value setting unit" comprises the focus signal processor 73 and the main controller 20. The claimed "defocus value storage unit" comprises the memory 11. Furthermore, the claimed "approximate error rate line calculating unit" comprises the main controller 20 including the error rate detector 24 and the approximate line calculator 25.

Figure 2:
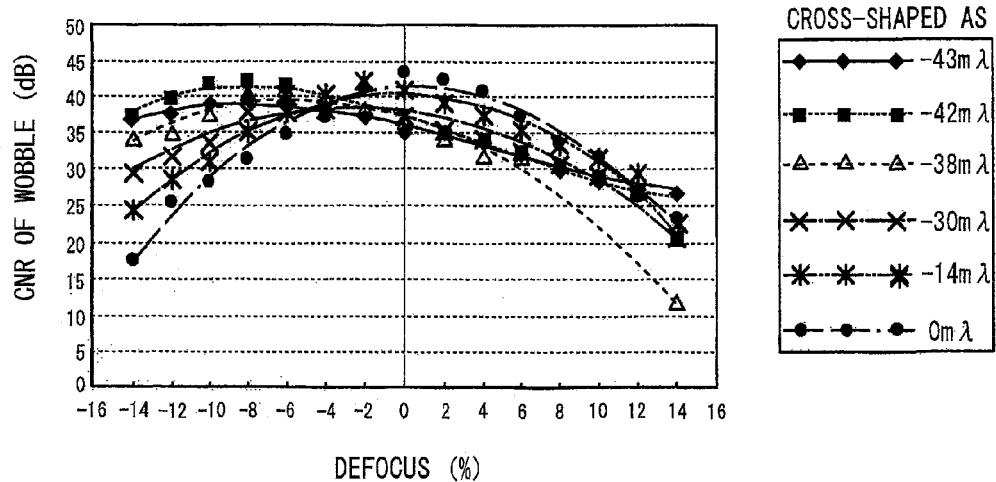
FIG. 2 is a graph of wobble signal level characteristics of the optical disc apparatus.
Figure 3:
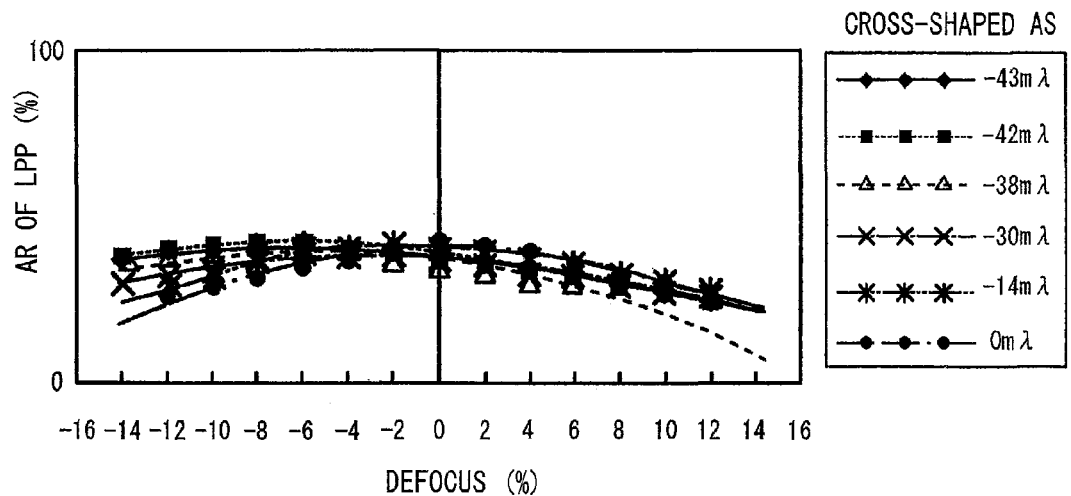
FIG. 3 is a graph of LPP signal level characteristics of the optical disc apparatus.

Referring now to FIG. 2 and FIG. 3, the relationship of the wobble signal level characteristics and the LPP signal level characteristics to the amount of defocus of the objective lens (defocus value in percentage) will be described, using astigmatism (AS) of the optical system of the optical pickup 4 as a parameter. FIG. 2 is a graph of the wobble signal level characteristics of the optical disc apparatus 1, showing the variation in the signal level of the wobble signal, where the vertical axis is CNR (Carrier-to-Noise Ratio) of wobble (dB) representing the signal level of a wobble signal, while the horizontal axis is defocus value in percentage (%) and graduated left and right with equidistant divisions, in which the defocus value corresponding to the best jitter performance is defined as 0 (zero) %. The term "defocus" is used to mean an operation of moving an objective lens to find a focus position of a laser beam on a recording surface of the optical disc 2. Thus, a "defocus position" of an objective lens is a position of the objective lens in the process of finding the focus position. The "defocus value" thus means a value of the position of the objective lens relative to the reference value of 0 (zero) %.

The defocus value in percentage (%) of the horizontal axis is calculated based on a ratio of the amplitude of a focus error signal to the focus bias value giving the best jitter performance. The signal level detector 23 detects (measures) the signal levels of wobble signals of the optical pickup 4 with various cross-shaped astigmatisms (AS) (0 λm to −40 λm), each having a cross-shaped distortion, as parameters, whereby the wobble signal level characteristics of the optical disc apparatus 1 for each cross-shaped astigmatism (As) as a parameter can be obtained. Note that the unit of the cross-shaped astigmatism (AS) is expressed by mλ (milli-lambda), or more precisely mλ rms (milli-lambda root means square), representing the light wavelength.

Further note that in order to prepare the various cross-shaped astigmatisms (AS) of the optical pickup 4, the optical system of the optical pickup 4 is varied to vary the cross-shaped astigmatism (AS). From the detected (measured) wobble signal level characteristics of the optical disc apparatus 1 for each cross-shaped astigmatism (AS), an approximate quadratic line or curve corresponding thereto is calculated, whereby a peak value of the wobble signal level characteristics for each cross-shaped astigmatism (AS) is obtained. Note that the approximate quadratic line (i.e. quadratic curve approximation) can be calculated by least squares approximation. Table 1 below shows an exemplary set of thus obtained six wobble signal levels as peak values for six cross-shaped astigmatisms (AS) of −43, −42, −38, −30, −14 and 0 λm.

TABLE 1

|  | Cross-shaped AS (mλ rms) | | | | | |
|---|---|---|---|---|---|---|
|  | −43 | −42 | −38 | −30 | −14 | 0 |
| Wobble Signal Level (dB) | 34.90 | 36.10 | 35.92 | 37.20 | 40.75 | 43.44 |

The wobble signal levels (dB) in Table 1 are those with various cross-shaped AS values in the case where the defocus value is 0 (zero) % which gives the best jitter performance. It is apparent from Table 1 that the wobble signal level decreases as the cross-shaped AS value gets farther from 0 (zero). If the cross-shaped AS is −43 mλ, the wobble signal (CNR) decreases by about 9 dB from that with the cross-shaped AS of 0 (zero), so that it is extremely difficult to read the wobble signal as is. However, referring to FIG. 2, if here the defocus value in the case of the cross-shaped AS value of −43 mλ is adjusted to be −8% which is roughly a defocus value giving a peak value of the wobble signal level characteristics for the cross-shaped AS value of −43 mλ, then the wobble signal level becomes about 40 dB, which is improved by about 5 dB, whereby it becomes possible to read the wobble signal. Thus, when the wobble signal level detected at the defocus value of 0% giving the best jitter performance is low, the wobble signal level can be improved and increased by calculating an approximate line of the wobble signal level characteristics, and by adjusting the defocus value to be that at a peak value of the approximate line or the wobble signal level characteristics.

FIG. 3 is a graph of the LPP signal level characteristics of the optical disc apparatus 1, showing the variation in the signal level of the LPP signal with defocus value, using astigmatism (AS) of the optical system of the optical pickup 4 as a parameter, similarly as in FIG. 2. Here, the vertical axis is AR (Aperture Ratio: refer to FIGS. 4A and 4B) in percentage (%) of LPP representing the signal level of an LPP signal, while the horizontal axis is defocus value in percentage (%) and graduated left and right with equidistant divisions, in which the defocus value corresponding to the best jitter performance is defined as 0 (zero) %. Similarly as in FIG. 2, the lines or curves of the LPP signal level characteristics shown in FIG. 3 are those obtained by detecting (measuring) LPP signal levels with the various cross-shaped astigmatisms (AS), and by subjecting the detected (measured) LPP signal levels to calculation using the quadratic curve approximation.

Figure 4A:
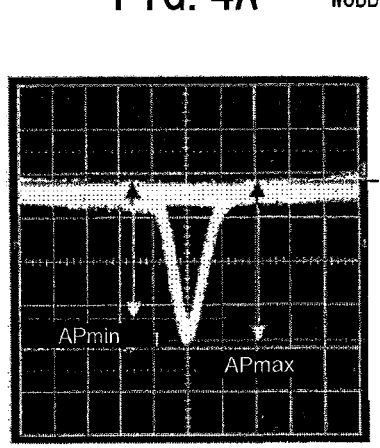
FIGS. 4A and 4B are graphical views of an exemplary set of LPP signals, showing waveforms of the LPP signals with a high LPP signal level and a low LPP signal level, respectively.
Figure 4B:
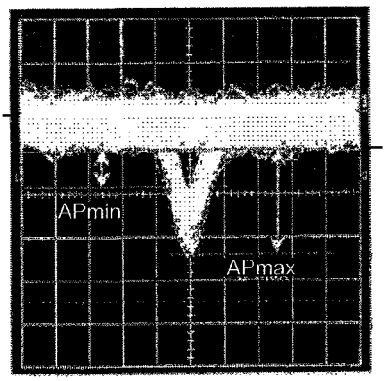

FIGS. 4A and 4B are graphical views of an exemplary set of LPP signals, showing waveforms of the LPP signals, displayed on a display, with a high LPP signal level and a low LPP signal level, respectively, and used to explain AR (Aperture Ratio) in the high and low LPP signal levels, respectively. This AR is defined based on the magnitude of an aperture (opening) of a waveform of an LPP signal, in which the aperture of the wave form of each LPP signal is formed by a base part and a wave (signal) part thereof, i.e. is a black triangular part formed by a horizontally extending white thick line and a white triangular thick curve (signal) in each of FIGS. 4A and 4B. More specifically, the AR is defined by APmin/APmax where APmax and APmin are a maximum amplitude and a minimum amplitude of the thick curve at a peak of the LPP signal, respectively. Note that the base line for measuring the APmax and APmin is either a wobble signal center line in the case of high LPP signal level (as in FIG. 4A) or a reference line in the case of low LPP signal level (as in FIG. 4B), in which the latter-described reference line is drawn at a superficial position of the base part close to the wave (signal) part because the low level LPP signal causes much noise (thicker while line as in FIG. 4B).

As apparent from these drawings, the LPP signal level in FIG. 4A is higher than that in FIG. 4B, and the aperture in the high LPP signal level is larger than that in the low LPP signal level, causing a high AR. In contrast, in FIG. 4B, the LPP signal level is low with much noise, causing a low AR, and making it difficult to read the LPP signal. Similarly as in the case of the wobble signal, if the LPP signal level detected (measured) at the defocus value of 0 (zero) %, the LPP signal level can be improved and increased by calculating an approximate line of the LPP signal level characteristics (AR level characteristics), and by adjusting the defocus value to be that at a peak value of the approximate line or the LPP signal level characteristics, thereby making it possible to read the LPP signal.

Referring now to the flow chart of FIG. 5, the operation of the optical disc apparatus 1 to perform a process of adjusting the defocus value so as to read address information on the optical disc 2 will be described. The main controller 20 controls the servo controller 9 to, in turn, control the objective lens 44 to focus the laser beam onto a signal recording surface of the optical disc 2, thereby turning on the focus (S1). If the wobble signal extractor 62 extracts a wobble signal (f1) of a plus R disc by frequency separation (YES in S2), and if the address information detector 21 succeeds in reading an ADIP signal (YES in S3), then the ADIP signal processor 75 performs address reproduction (S4), and the jitter signal processor 72 detects a defocus value giving the best jitter performance to minimize the jitter, and further the main controller 20 controls and allows the focus position to cause, or correspond to, the thus detected defocus value (S5). Further, the main controller 20 controls the RF signal processor 74 to reproduce recorded data on the optical disc 2 (S6).

If NO in step S3 (i.e. if failing in reading), the offset adjuster 22 of the main controller 20 offsets the defocus value to two points which are respectively offset in the plus and minus directions from the defocus value giving the best jitter performance. Based on the two defocus values at the two offset points, the signal level detector 23 detects signal level characteristics of the wobble signal (f1) (S7). The approximate line calculator 25 subjects the thus detected signal level characteristics to quadratic curve approximation so as to calculate a maximum signal level of the wobble signal (f1) (S8). The main controller 20 adjusts the defocus value, i.e. adjusts the defocus position of the objective lens relative to the optical disc 2, to cause the maximum level of the wobble signal (f1) (S9). If the address information detector 21 succeeds in reading an ADIP signal at the maximum or optimum signal level of the wobble signal (f1) (YES in S10), the process returns to step S4 to perform address reproduction, defocus adjustment for best jitter (S5) and data reproduction of the optical disc 2 (S6) similarly as above. On the other hand, if NO in step S10 (i.e. if failing in reading), the main controller 20 determines that the address information is not detected from the optical disc 2, thereby displaying disc error detection (S11).

If NO in step S2, and if the wobble signal extractor 62 extracts a wobble signal (f2) of a minus R disc by frequency separation (YES in S12), and further if the address information detector 21 succeeds in reading an LPP signal (YES in S13), then the main controller 20 controls the LPP signal processor 76 to perform address reproduction (S4), and subsequently performs defocus adjustment for best jitter (S5) and data reproduction of the optical disc 2 (S6) similarly as above. On the other hand, if NO in step S13 (i.e. if failing in reading), the offset adjuster 22 of the main controller 20 offsets the defocus value to two points which are respectively offset in the plus and minus directions from the defocus value giving the best jitter performance. Based on the two defocus values at the two offset points, the signal level detector 23 detects AR level characteristics as signal level characteristics of the LPP signal (f2) (S14).

The approximate line calculator 25 subjects the thus detected AR level characteristics to quadratic curve approximation so as to calculate a maximum signal level of the AR level (S15). The main controller 20 adjusts the defocus value, i.e. adjusts the defocus position of objective lens relative to the optical disc 2, to cause the maximum signal level of the AR level (S16). If the address information detector 21 succeeds in reading an LPP signal at the maximum or optimum signal level of the AR level (YES in S17), the process returns to step S4 to perform address reproduction, defocus adjustment for best jitter (S5) and data reproduction of the optical disc 2 (S6) similarly as above. On the other hand, if NO in step S17 (i.e. if failing in reading), the main controller 20 determines that the address information is not detected from the optical disc 2, thereby displaying disc error detection (S11). Further, if NO in step S12, the main controller 20 detects an optical disc other than the plus/minus discs (S18).

According to the arrangement of the optical disc apparatus 1, when an optical disc 2 is inserted therein, the main controller 20 first controls the optical pickup 4 to read address information of an ADIP signal or an LPP signal on the optical disc 2. When it is not possible to read the address information, the main controller 20 adjusts the focal position of the objective lens 44 by defocusing so as to detect signal level characteristics of the address information. The main controller 20 subjects the thus detected signal level characteristics to quadratic curve approximation so as to obtain an approximate line (curve), thereby detecting or obtaining a peak value of the signal level characteristics, and adjusts and allows the defocus value to cause or correspond to the thus obtained peak value, making it possible to improve the signal level.

Further, the approximate line or curve is calculated simply by using two offset points of defocus values which are offset from the defocus value giving the best jitter performance. Accordingly, the calculation does not require a long time, thereby making it possible to quickly obtain a peak value of the signal level characteristics. Thus, even if address information on the optical disc 2 cannot be read at an initial reading of the optical disc 2, depending on the defocus position of the objective lens relative to the optical disc 2, i.e. depending on the defocus value, the address information can be quickly read by adjusting the defocus and increasing the signal level of the address signal.

As described in the foregoing, the optical disc apparatus 1 according to the first embodiment makes it possible to quickly obtain a peak value of an address signal (ADIP or LPP signal) on an optical disc 2 in the case where the address information cannot be read at an initial reading of the optical disc 2. The signal level of the address signal can be improved or increased by offsetting or shifting the defocus value (i.e. defocus position of the objective lens) to where the peak value is given, thereby making it possible to read the address information and to reproduce the address signal for recording/reproduction of the optical disc 2. By adjusting the defocus value for best jitter performance after address reproduction, it becomes possible to reproduce a good image with minimized jitter. Further, after the image is reproduced, it is possible to make address setting by acquiring address information from address information contained in an RF signal without using address information contained in the ADIP signal or the LPP signal. Accordingly, it is possible to normally reproduce address signals in the state of best jitter performance as well. Thus, both secure reading of address information at an initial reading of the optical disc 2 and high quality image reproduction can be achieved at the same time.

Second Embodiment

Next, referring to FIG. 6, FIG. 7 and FIG. 8 in addition to FIG. 1, FIG. 2 and FIG. 5, an optical disc apparatus 1 according to a second embodiment of the present invention will be described. The optical disc apparatus 1 of the present embodiment has a similar hardware configuration to that of the first embodiment shown in FIG. 1, except that the operation of the main controller 20 is different here. More specifically, in the present embodiment, the main controller 20 has an error rate detector 24 for detecting error rate characteristics of an ADIP signal and an LPP signal to control and allow the defocus value (i.e. defocus position of the objective lens relative to an optical disc 2) to cause, or correspond to, a bottom value of the error rate characteristics of each of the ADIP and LPP signals so as to read address information on the optical disc 2.

Figure 6:
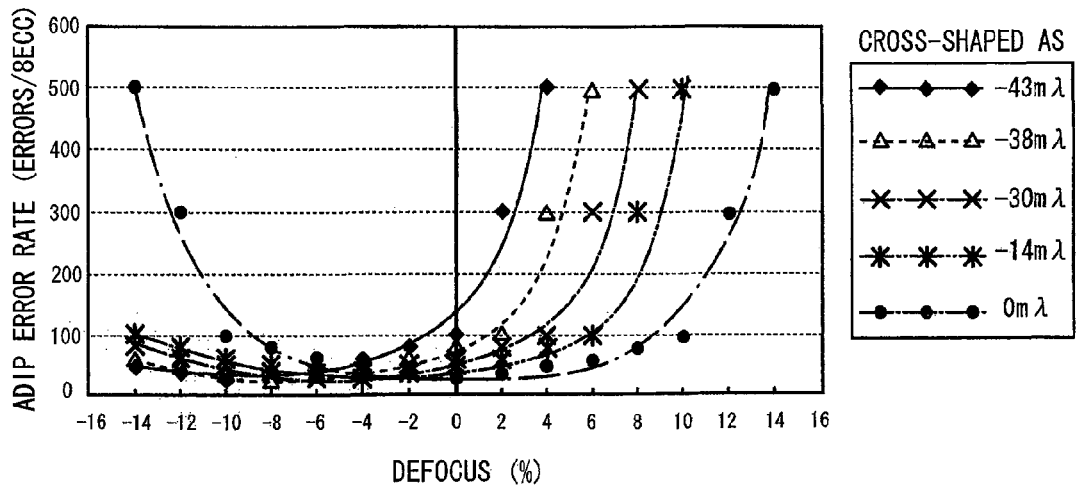
FIG. 6 is a graph of ADIP error rate characteristics of an optical disc apparatus.
Figure 7:
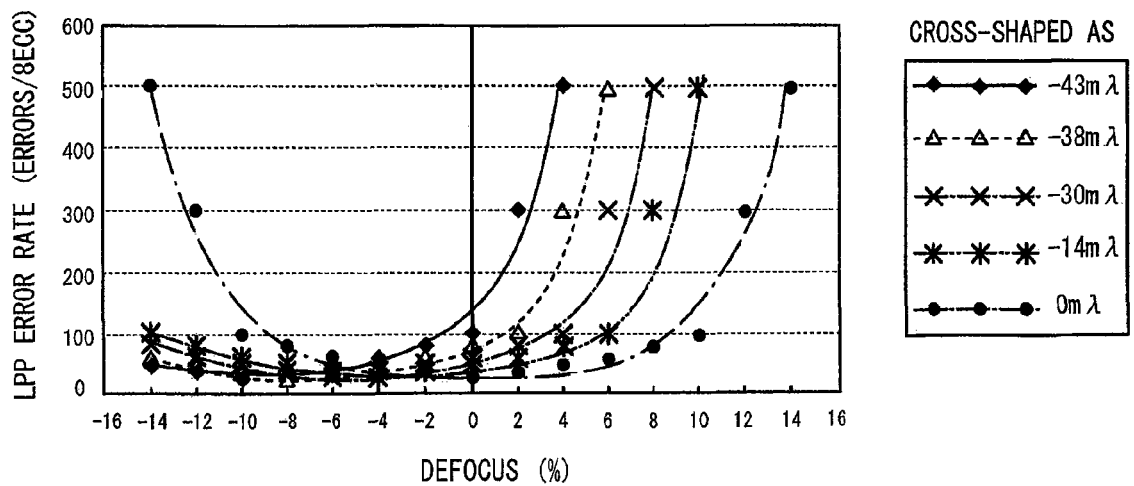
FIG. 7 is a graph of LPP error rate characteristics of the optical disc apparatus.
Figure 8:
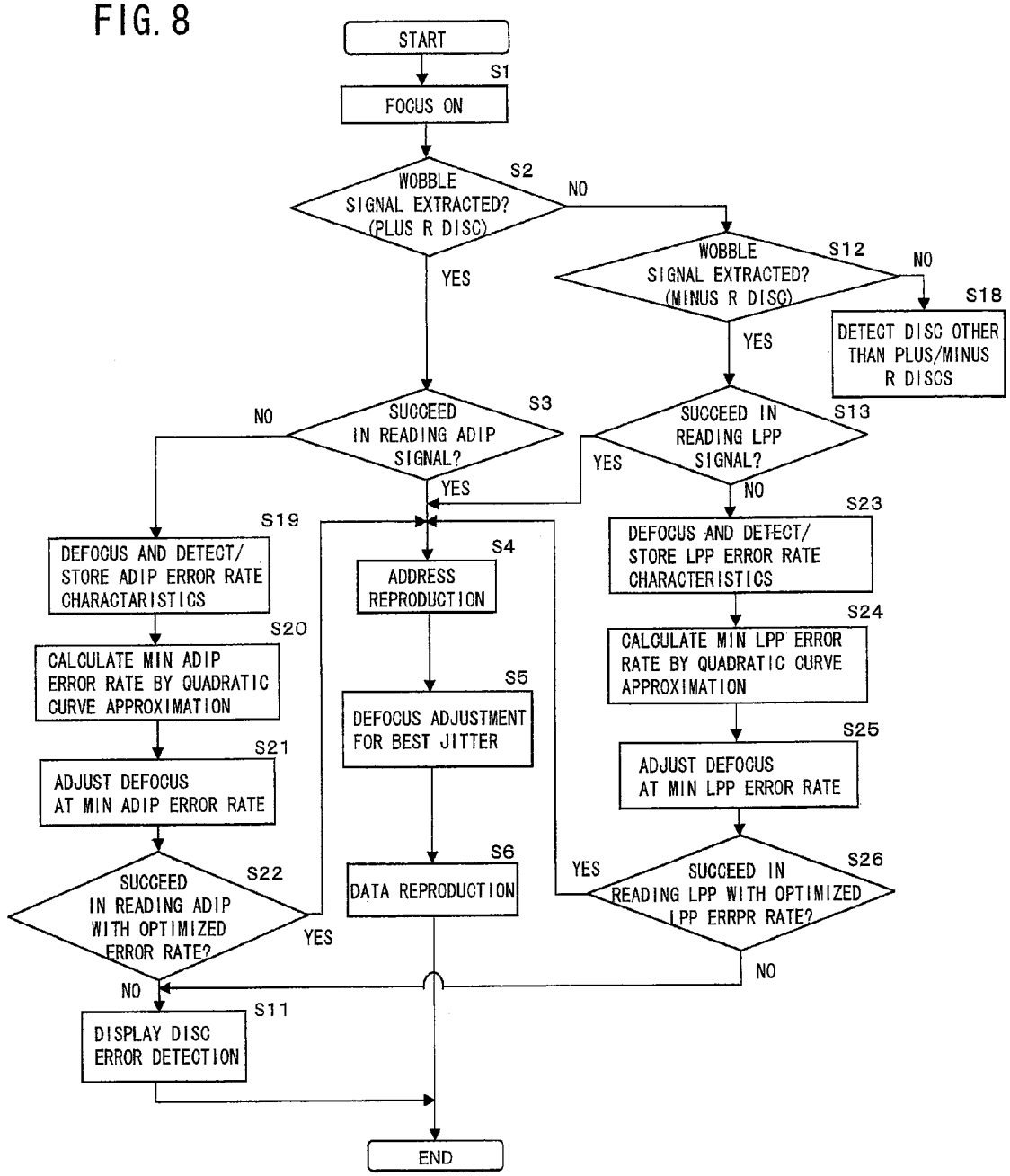
FIG. 8 is a flow chart showing an operation of the optical disc apparatus to perform a process for reading address information on an optical disc.

FIG. 6 and FIG. 7 are graphs of ADIP error rate characteristics and LPP error rate characteristics of the optical disc apparatus 1, showing the variation, with defocus value, of the ADIP error rate of the ADIP signal and the LPP error rate of the LPP signal, using astigmatism (AS) of the optical system of an optical pickup 4 of the optical disc apparatus 1 as a parameter, similarly as in FIG. 2. Here, the vertical axis is ADIP error rate (number of errors per 8 ECC blocks) in FIG. 6 and LPP error rate (number of errors per 8 ECC blocks) in FIG. 7 where ECC stands for Error Correction Code. On the other hand, the horizontal axis is defocus value in percentage (%) and graduated left and right with equidistant divisions, in which the defocus value corresponding to the best jitter performance is defined as 0 (zero) %. Similarly as in FIG. 2, the lines or curves of the ADIP error rate characteristics in FIG. 6 and LPP error rate characteristics in FIG. 7 are those obtained by detecting or measuring ADIP and LPP error rates of the ADIP and LPP signals with the various cross-shaped astigmatisms (AS) at various defocus values including 0 (zero) % and those offset in the plus and minus directions from 0%, and by subjecting the detected (measured) ADIP and LPP error rates to calculation using the quadratic curve approximation.

As shown in FIG. 6 and FIG. 7, the error rate characteristics in each of FIG. 6 and FIG. 7 has a bottom value with the variation of the defocus value. Thus, if an error rate detected at a defocus value of 0% giving the best jitter performance is so high (depending on the defocus position of the objective lens relative to the optical disc 2) as to make it impossible to read address information (ADIP/LPP signal), an approximate line of each of the error rate characteristics is calculated based on error rates detected (measured) with offset defocus values, and the defocus value is adjusted corresponding to the bottom value of the error rate characteristics so as to make it possible to improve or reduce the error rate, whereby it becomes possible to read the ADIP/LPP signal which cannot be read depending on the defocus value.

Referring now to the flow chart of FIG. 8, the operation of the optical disc apparatus 1 to perform a process of adjusting the defocus value so as to read address information on the optical disc 2 will be described. The flow chart of FIG. 8 is similar to that of FIG. 5, except for the difference between the ADIP/LPP signal level characteristics in FIG. 5 and the ADIP/LPP error rate characteristics in FIG. 8. Thus, a description will be made only on the difference. If NO in step S3 (i.e. if the address information detector 21 does not succeed or fails in reading an ADIP signal), the offset adjuster 22 of the main controller 20 offsets the defocus value to two points which are respectively offset in the plus and minus directions from the defocus value giving the best jitter performance. Based on the two defocus values at the two offset points, the error rate detector 24 detects the error rate of the ADIP signal, and stores the detected error rate in the memory 11 (S19).

The approximate line calculator 25 subjects the error rate characteristics of thus detected error rates to quadratic curve approximation to calculate a minimum or optimum error rate (S20). The main controller 20 allows the defocus value (i.e. the defocus position of the objective lens relative to the optical disc 2) to cause, or correspond to, the minimum error rate (S21). If the address information detector 21 succeeds in reading an ADIP signal at the minimum or optimum error rate (YES in S22), the process returns to step S4 to perform address reproduction, defocus adjustment for best jitter (S5) and data reproduction of the optical disc 2 (S6) similarly as in the first embodiment. On the other hand, if NO in step S22 (i.e. if failing in reading), the main controller 20 determines that the address information is not detected from the optical disc 2, thereby displaying disc error detection (S11).

On the other hand, if NO in step S13 (i.e. if failing in reading), the offset adjuster 22 of the main controller 20 offsets the defocus value to two points which are respectively offset in the plus and minus directions from the defocus value giving the best jitter performance. Based on the two defocus values at the two offset points, the error detector 24 detects an error rate of an LPP signal (S23). The approximate line calculator 25 subjects the error rate characteristics of the thus detected error rates to quadratic curve approximation so as to calculate a minimum or optimum error rate (S24). The main controller 20 adjusts and allows the defocus value (i.e. defocus position of the objective lens relative to the optical disc 2) to cause or correspond to the minimum error rate (S25). If the address information detector 21 succeeds in reading an LPP signal at the minimum or optimum error rate (YES in S26), the process returns to step S4 to perform address reproduction, defocus adjustment for best jitter (S5) and data reproduction of the optical disc 2 (S6) similarly as above. On the other hand, if NO in step S26 (i.e. if failing in reading), the main controller 20 determines that the address information is not detected from the optical disc 2, thereby displaying disc error detection (S11).

As described in the foregoing, the optical disc apparatus 1 according to the second embodiment makes it possible to reduce the error rate by offsetting or shifting the defocus value or defocus position of the objective lens to where the bottom value of the error rate is given, even in the case where the address information cannot be read at an initial reading of the optical disc 2. Thus, even if address information on the optical disc 2 cannot be read at an initial reading of the optical disc 2, depending on the defocus position (defocus value) of the objective lens relative to the optical disc 2, the address information can be quickly read by adjusting the defocus and reducing the error rate of the address signal, thereby making it possible to reproduce the address signal for recording/reproduction of the optical disc 2. Furthermore, since the address information is read at a defocus value (defocus position) giving a minimum or optimum error rate, the ADIP/LPP signal can be read more securely and accurately.

Third Embodiment

Next, referring to FIG. 9, FIG. 10 and FIG. 11 in addition to FIG. 1, FIG. 2 and FIG. 3, an optical disc apparatus 1 according to a third embodiment of the present invention will be described. The optical disc apparatus 1 of the present embodiment has a similar hardware configuration to that of the first embodiment shown in FIG. 1, except for a difference of defocus adjustment when reading address information for an initial reading of an optical disc 2. More specifically, the optical system of an optical pickup 4 of the optical disc apparatus 1 is varied to prepare various astigmatism (AS) values. The optical disc apparatus 1 is subjected to the measurements of signal level characteristics for the various AS values in advance so as to calculate, by quadratic curve approximation, approximate lines (curves) in a graph of defocus value versus each of wobble signal level characteristics and LPP signal level characteristics, in which the approximate lines intersect at one or two intersections.

Thereafter, a main controller 20 (claimed "defocus value setting unit") finds a defocus value which gives a high signal level and at which the intersections of the approximate lines are concentrated. Such defocus value is referred to as intersection defocus value. The defocus value is stored in the memory 11 (claimed "defocus value storage unit"). At an initial reading of the optical disc 2, the main controller 20 adjusts the defocus value (i.e. defocus position of an objective lens relative to the optical disc 2) at the intersection defocus value stored in the memory 11 so as to read address information on the optical disc 2. This will be described in more detail below.

Figure 9:
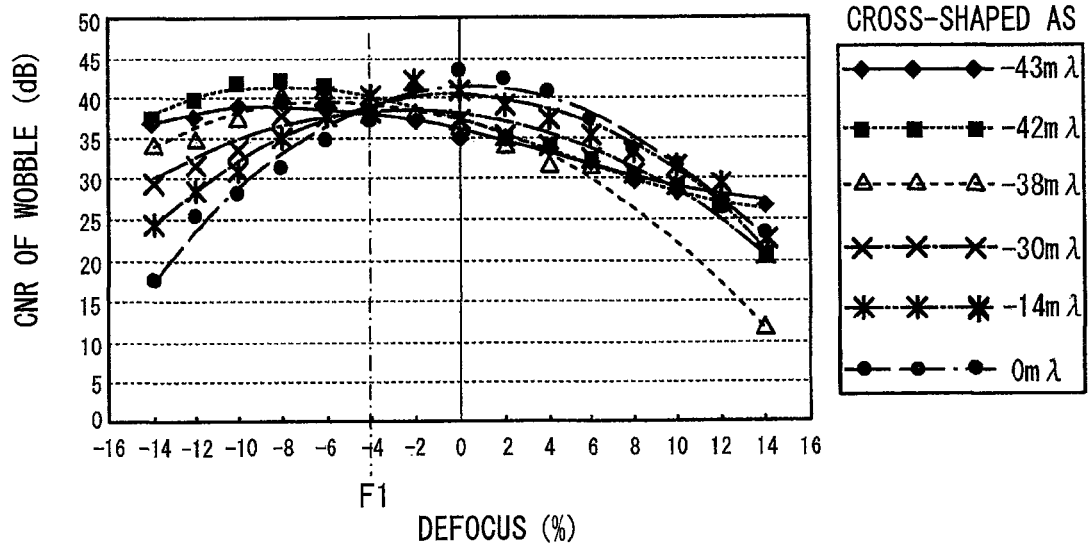
FIG. 9 is a graph of wobble signal characteristics of an optical disc apparatus, showing the variation in the wobble signal characteristics with defocus value, using astigmatism value of the optical disc apparatus as a parameter, for explaining a defocus value at an intersection between approximate curves of the wobble signal characteristics.

FIG. 9 is a graph of wobble signal characteristics of the optical disc apparatus 1, showing the variation in CNR (Carrier-to-Noise Ratio) of wobble signals with defocus value, using astigmatism (AS) of the optical system of the optical pickup 4 of the optical disc apparatus 1 as a parameter. Likewise, FIG. 10 is a graph of LPP signal level characteristics of the optical disc apparatus 1, showing the variation in AR (Aperture Ratio) of LPP with defocus value, also using the same astigmatism (AS) as a parameter. The vertical axis and the horizontal axis of the graph of FIG. 9 are the same as those of FIG. 2, while those of FIG. 10 are the same as those of FIG. 3. Similarly as in FIG. 2 and FIG. 3, the lines or curves in FIG. 9 and FIG. 10 are those obtained by detecting or measuring the CNR values of the wobble signals and AR values of the LPP signals with the various AS values as parameters, and by subjecting the detected or measured CNR and AR values to calculation using the quadratic curve approximation.

Referring to FIG. 9, the combination of the main controller 20 and the focus signal process 73 (claimed "defocus value setting unit") finds an intersection defocus value F1. More specifically, in FIG. 9, the approximate lines (curves) of wobble CNR are concentrated at a defocus value of about −4% and a defocus value of about 12%. The former defocus value gives a higher CNR of wobble than the latter defocus value, so that the main controller 20 determines the former defocus value as an intersection defocus value, which is designated by F1 in FIG. 9. On the other hand, in FIG. 10, the approximate lines (curves) of AR of LPP are concentrated at a defocus value of about −3% which gives a high AR of LPP, so that the main controller 20 determines this defocus value as an intersection defocus value, which is designated by F2 in FIG. 10. The main controller 20 stores these intersection defocus values F1 and F2 in the memory 11 in advance.

Figure 10:
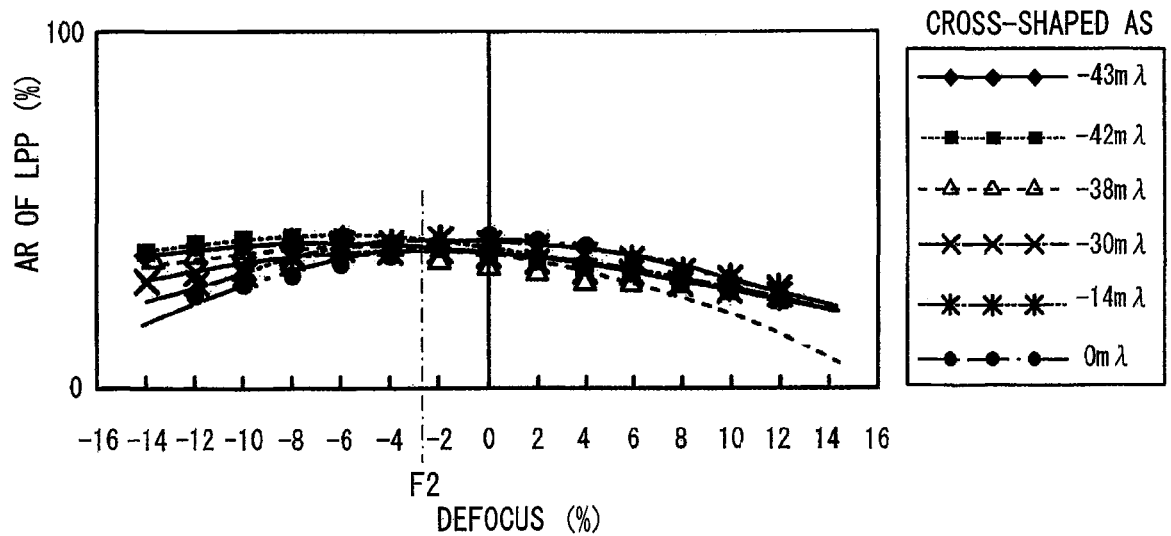
FIG. 10 is a graph of LPP signal level characteristics of the optical disc apparatus, showing the variation in the LPP signal characteristics with defocus value, also using the astigmatism value as a parameter, for explaining a defocus value at an intersection between approximate curves of the LPP signal characteristics.
Figure 11:
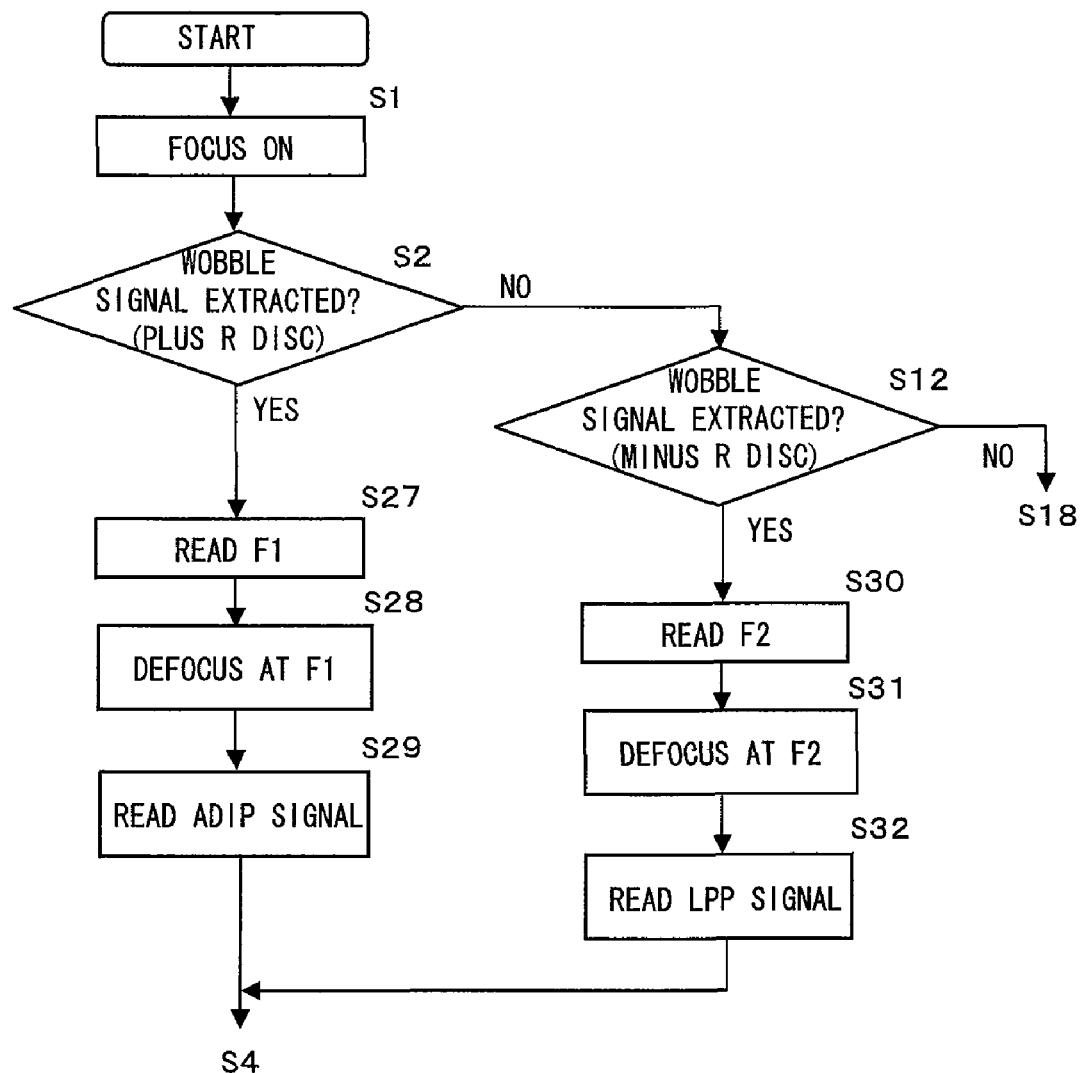
FIG. 11 is a flow chart showing an operation of the optical disc apparatus to perform a process of reading address information on an optical disc.

It is apparent from FIG. 9 and FIG. 10 that at the intersection defocus values F1 and F2, the wobble signal level characteristics (CNR or wobble) and the LPP signal level characteristics (AR of LPP) even with the different cross-shaped astigmatism (AS) values, or regardless of the AS values, are close to the respective signal levels at the defocus value of 0 (zero) % giving the best jitter performance with the AS value of 0 m$\lambda$. This makes it evident that at an initial reading of the optical disc 2, the intersection defocus value F1 in the case of wobble signals with ADIP signals and the intersection defocus value F2 in the case of the LPP signals can be used each as an optional initial defocus value at which the optical disc apparatus 1 is to be initially set. In other word, these intersection defocus values F1 and F2 give a high probability of enabling detection of the respective signal levels at a high signal level, thereby enabling reading of the ADIP signals and LPP signals at an initial reading of optical discs 2, respectively.

Referring now to the flow chart of FIG. 11, the operation of the optical disc apparatus 1 of the present embodiment to perform a process of adjusting or setting the defocus value so as to read address information on the optical disc 2 will be described. Here, a description will be made only on a difference from the flow chart of FIG. 5 in the first embodiment, omitting a description common to the flow chart of FIG. 5. First, at an initial reading of the optical disc 2, if YES in step S2, the main controller 20 reads, from the memory 11, an intersection defocus value F1 stored therein in advance (S27), and adjusts or sets the defocus value at F1 (S28). The address information detector 21 then reads an ADIP signal (S29). On the other hand, if YES in S12, the main controller 20 reads, from the memory 11, an intersection defocus value F2 stored therein in advance (S30), and adjusts or sets the defocus value at F2 (S31). The address information detector 21 then reads an LPP signal (S32). After reading the address information, the process goes to steps S4, S5 and S6 described in the first and second embodiments (FIG. 5 and FIG. 8) to perform address reproduction, defocus adjustment for best jitter and data reproduction.

As described in the foregoing, the optical disc apparatus 1 according to the third embodiment calculates, by quadratic curve approximation, approximate lines (curves) of the respective signals level characteristics with varied AS values by varying the AS value of the optical system thereof. Thereafter, the optical disc apparatus 1 finds intersection defocus values (F1 and F2) which each give a high signal level and at which the intersections of the approximate lines are concentrated in the graphs of the respective signal level characteristics, and stores the values F1, F2 in the memory 11 in advance. At an initial reading of the optical disc 2, the main controller 20 directly uses the intersection defocus value (F1/F2) stored in the memory 11, i.e. automatically adjusts the defocus value at the intersection defocus value.

This makes it possible to give a high probability of enabling reading of the respective address information on the optical disc 2 even with different AS values, or regardless of the AS values. In other words, the range of AS values in which the address information can be detected or read can be expanded. Thus, it can be said that the variation in AS value of the optical system of the optical disc apparatus 1 including an objective lens, which is caused in the manufacturing process of the optical disc apparatus 1, can be absorbed by the optical disc apparatus according to the third embodiment, thereby leading to an improvement in the production yield and cost reduction of the optical disc apparatus 1.

It is to be noted that the present invention is not limited to the above described embodiments, and various modifications are possible within the scope of the present invention. For example, it is possible to make a defocus adjustment at a minimum error rate of an ADIP error rate signal after making a defocus adjustment at a peak value of the ADIP signal, thereby increasing the accuracy of address information reproduction based on the ADIP signal. In addition, for calculating approximate lines, it is also possible to increase the number of points (from two points) for offset in the plus and minus directions from a defocus position giving the best (or minimum) jitter performance The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising:
   an optical pickup for irradiating a laser beam onto an optical disc through an objective lens to record or read data on or from the optical disc;
   an address information reading unit for using the data read by the optical pickup to read address information in the data based on wobbled grooves and/or land pre-pits preformatted and recorded on the optical disc, and to detect signal levels of the address information;
   an RF signal reading unit for reading an RF signal corresponding to the data recorded on the optical disc; and
   a defocus control unit for controlling jitter of the RF signal read by the RF signal reading unit and for adjusting a defocus position of the objective lens based on a focus error signal to perform focus control,
   wherein the defocus control unit comprises:
   a reading determination unit which, at an initial reading of the optical disc, controls the address information reading unit to read the address information, and determines based on the reading of the address information reading unit whether the address information reading unit succeeds in reading the address information;
   a defocus position offset unit for offsetting the defocus position of the objective lens when the reading determination unit determines that the address information reading unit fails in reading the address information;
   an approximate level line calculating unit for calculating an approximate line of characteristics of the signal levels of the address information detected by the address information reading unit at defocus positions offset by the defocus position offset unit; and
   a defocus position adjusting unit for adjusting the defocus position of the objective lens at a position corresponding to a peak value of the approximate line calculated by the approximate level line calculating unit, and
   wherein after the defocus position adjusting unit adjusts the defocus position, the defocus control unit controls the address information reading unit to read the address information, thereby improving the signal level of the address information to be read.

2. The optical disc apparatus according to claim 1, wherein the defocus position offset unit offsets the defocus position of the objective lens to two points, which are offset in plus and minus directions from the defocus position giving minimum jitter, when the reading determination unit determines that the address information reading unit fails in reading the address information, and
   wherein the approximate level line calculating unit calculates the approximate line of characteristics of the signal levels of the address information detected by the address information reading unit at the two points of defocus positions offset by the defocus position offset unit.

3. The optical disc apparatus according to claim 1, wherein the approximate level line calculating unit calculates, by quadratic curve approximation, the approximate line using astigmatism of the characteristics of the signal levels as a parameter.

4. An optical disc apparatus comprising:
   an optical pickup for irradiating a laser beam onto an optical disc through an objective lens to record or read data on or from the optical disc;
   an address information reading unit for using the data read by the optical pickup to read address information in the data based on wobbled grooves and/or land pre-pits preformatted and recorded on the optical disc, and to detect error rates of the address information;
   an RF signal reading unit for reading an RF signal corresponding to the data recorded on the optical disc; and
   a defocus control unit for controlling jitter of the RF signal read by the RF signal reading unit and for adjusting a defocus position of the objective lens based on a focus error signal to perform focus control,
   wherein the defocus control unit comprises:
   a reading determination unit which, at an initial reading of the optical disc, controls the address information reading unit to read the address information, and determines based on the reading of the address information reading unit whether the address information reading unit succeeds in reading the address information;
   a defocus position offset unit for offsetting the defocus position of the objective lens when the reading determination unit determines that the address information reading unit fails in reading the address information;
   an approximate error rate line calculating unit for calculating an approximate line of characteristics of the error rates of the address information detected by the address information reading unit at defocus positions offset by the defocus position offset unit; and
   a defocus position adjusting unit for adjusting the defocus position of the objective lens at a position corresponding to a bottom value of the approximate line calculated by the approximate error rate line calculating unit, and
   wherein after the defocus position adjusting unit adjusts the defocus position, the defocus control unit controls the address information reading unit to read the address information, thereby improving the error rate of the address information to be read.

5. The optical disc apparatus according to claim 4, wherein the defocus position offset unit offsets the defocus position of the objective lens to two points, which are offset in plus and minus directions from the defocus position giving minimum jitter, when the reading determination unit determines that the address information reading unit fails in reading the address information, and wherein the approximate error rate line calculating unit calculates the approximate line of characteristics of the error rates of the address information detected by the address information reading unit at the two points of defocus positions offset by the defocus position offset unit.

6. The optical disc apparatus according to claim 4, wherein the approximate error rate line calculating unit calculates, by quadratic curve approximation, the approximate line using astigmatism of the characteristics of the error rates as a parameter.

7. An optical disc apparatus comprising:

an optical pickup for irradiating a laser beam onto an optical disc through an objective lens to record or read data on or from the optical disc;

an address information reading unit for using the data read by the optical pickup to read address information in the data based on wobbled grooves and/or land pre-pits preformatted and recorded on the optical disc, and to detect error rates of the address information;

an RF signal reading unit for reading an RF signal corresponding to the data recorded on the optical disc; and a defocus control unit for controlling jitter of the RF signal read by the RF signal reading unit and for adjusting a defocus position of the objective lens based on a focus error signal to perform focus control, wherein the defocus control unit comprises:

an approximate level line calculating unit for calculating, in advance, approximate lines of characteristics of signal levels with varied astigmatism values by varying the astigmatism value of the optical pickup, so as to find a defocus position (hereafter referred to as "intersection defocus position") of the objective lens which gives a high signal level and at which intersections of the approximate lines are concentrated in the characteristics of signal levels;

a storage unit for storing the intersection defocus in advance; and a defocus position adjusting unit which, at an initial reading of the optical disc, adjusts the defocus position of the objective lens at the intersection defocus position stored in the storage unit in advance.

8. The optical disc apparatus according to claim 7, wherein the approximate level line calculating unit calculates, by quadratic curve approximation, the approximate lines.

* * * * *